United States Patent
Chen et al.

(10) Patent No.: US 12,291,471 B2
(45) Date of Patent: May 6, 2025

(54) FLOCCULANT FOR CATALYTIC DECOMPOSITION OF FLUE GAS DESULFURIZATION WASTEWATER TREATMENT

(71) Applicants: Changzhou University, Changzhou (CN); Changzhou ZhenBang Chemical Manufacturing Co., LTD., Changzhou (CN)

(72) Inventors: Haiqun Chen, Changzhou (CN); Guangyu He, Changzhou (CN); Yi Cao, Changzhou (CN); Kun Wang, Changzhou (CN); Bin Ren, Changzhou (CN); Zhichun Cao, Changzhou (CN); Qun Chen, Changzhou (CN); Xingyue Qian, Changzhou (CN); Jiawei Xia, Changzhou (CN); Jingjing Yuan, Changzhou (CN)

(73) Assignees: Changzhou University, Changzhou (CN); Changzhou ZhenBang Chemical Manufacturing Co., LTD., Changzhou (CN)

( * ) Notice: Subject to any disclaimer, the term of this patent is extended or adjusted under 35 U.S.C. 154(b) by 89 days.

(21) Appl. No.: 17/726,561

(22) Filed: Apr. 22, 2022

(65) Prior Publication Data
US 2023/0183110 A1  Jun. 15, 2023

(30) Foreign Application Priority Data
Dec. 15, 2021 (CN) .......................... 202111584784.3

(51) Int. Cl.
  C02F 1/56  (2023.01)
  B01D 21/01  (2006.01)
  (Continued)

(52) U.S. Cl.
  CPC ................ *C02F 1/56* (2013.01); *B01D 21/01* (2013.01); *C02F 1/5236* (2013.01);
  (Continued)

(58) Field of Classification Search
  None
  See application file for complete search history.

(56) References Cited

U.S. PATENT DOCUMENTS 5,961,839 A * 10/1999 Simmsgeiger ............ C02F 1/50
  210/734
11,096,391 B1 * 8/2021 Pashovych .............. C02F 1/505
  (Continued)

OTHER PUBLICATIONS

Wang et al. ("Application of a Novel Cationic Polyacrylamide as Flocculant in Treatment of Papermaking Wastewater", pp. 1-4, 2010, 4th International Conference on Bioinformatics and Biomedical Engineering). (Year: 2010).*
(Continued)

*Primary Examiner* — Clare M Perrin
(74) *Attorney, Agent, or Firm* — IDEA Intellectual Limited; Margaret A. Burke; Sam T. Yip

(57) ABSTRACT

The present invention provides a flocculant for catalytic decomposition of flue gas desulfurization wastewater treatment. The flocculant includes polyacrylamide, inorganic polymer, and an inorganic compound with low molecular weight. In the condition of using proper components, the flocculant has significant wastewater treatment performance.

7 Claims, 3 Drawing Sheets

(51) Int. Cl.
*C02F 1/52* (2023.01)
*C08F 20/56* (2006.01)
*C08F 26/02* (2006.01)
*C08L 33/26* (2006.01)
*C08L 39/02* (2006.01)
*C02F 103/00* (2006.01)
*C02F 103/18* (2006.01)
*C02F 103/28* (2006.01)
*C02F 103/30* (2006.01)
*C02F 103/34* (2006.01)
*C02F 103/36* (2006.01)

(52) U.S. Cl.
CPC ............ *C02F 1/5245* (2013.01); *C08F 20/56* (2013.01); *C08F 26/02* (2013.01); *C08L 33/26* (2013.01); *C08L 39/02* (2013.01); *C02F 2103/007* (2013.01); *C02F 2103/18* (2013.01); *C02F 2103/28* (2013.01); *C02F 2103/30* (2013.01); *C02F 2103/343* (2013.01)

(56) References Cited

U.S. PATENT DOCUMENTS

| 2011/0049058 A1* | 3/2011 | Unhoch | C02F 1/54 210/759 |
| 2014/0124454 A1* | 5/2014 | Nichols | C02F 1/5272 210/732 |
| 2015/0183668 A1* | 7/2015 | Mitsui | D21H 17/37 252/180 |

OTHER PUBLICATIONS

Xu et al. (Colloids and Surfaces A, 2014, 456, 211-221). (Year: 2014).*

* cited by examiner

Weight ratio of poly aluminum chloride to poly ferric sulfate

FLOCCULANT FOR CATALYTIC DECOMPOSITION OF FLUE GAS DESULFURIZATION WASTEWATER TREATMENT

FIELD OF THE INVENTION

The present invention relates to the field of industrial wastewater treatment. Particularly, the present invention relates to a flocculant for catalytic decomposition of flue gas desulfurization wastewater treatment.

BACKGROUND

The art of catalytic decomposition of flue gas desulfurization mainly divided into wet process, dry process, and semidry process. Catalytic decomposition of flue gas desulfurization in wet process is a widespread application of desulfurization technique. It is an established technique that offers high efficiency of SO2 removal, reliability, simplicity, and low cost. However, the components of wastewater generated from catalytic decomposition of flue gas desulfurization are complex. The main catalysts for catalytic decomposition include Ni, V, Ce, Cu, Al, Fe, Na, and Ca. Using flocculant allows for effective treatment of wasterwater generated from catalytic decomposition of flue gas deslfurization. Common flocculants used for wastewater generated from catalytic decomposition of flue gas desulfurization is a combination of PAC and polyacrylamide, or a combination of poly-aluminum sulfate and polyacrylamide. However, the performance of these flocculants is not ideal for long-term usage, and they pose many problems.

The temperature of flue gas desulfurization wastewater treatment in catalytic decomposition process is high, which is, about 55° C. to 65° C. This results in the added flocculant is easily decomposed in such high temperature. Because the desulfurization wastewater contains a large amount of salt, it is very dense, which leads to slow precipitation during flocculation. The floc formed by normal flocculant and suspended matter in the water cannot precipitate immediately. The catalysts used in catalytic decomposition process are varied, and catalysts entering into alkali wash water have a very small particle size. As such, performing flocculation by using standard agents is difficult.

In the last stage of wastewater treatment, a filter is used. Since the pore size of filter element is small, and the viscosity and molecular weight of organic polymeric flocculants are high, the filter element and residue filter are easily blocked. In addition, the residue is filtered by filter fabric at last stage. If the viscosity of said residue is too high, the filter fabric will be blocked. When using a bulge filter to treat wastewater generated by flue gas desulfurization, the flocculant should be able to achieve full flocculation and not block the filter easily. This will allow the wastewater to be treated, while the lifespan of the bulge filter is prolonged. Standard flocculants contain many chlorine ions that cause major corrosion in stainless steel apparatuses, which results in serious safety hazards.

The active ingredient of PAC (poly aluminum chloride) is only about 30%. Depending on different manufacturing processes and factories, the insoluble matter is at least about 35%. If PAC is the only type of flocculant used during the process, 1 t PAC will generate 1.75 t hazardous waste (solid content: 20%). If $10^{-4}$ amount of PAC is used for wastewater treatment, 1 t of PAC treated wastewater will generate 0.175 kg hazardous waste. This leads to treating the hazardous waste via costly, difficult techniques, and the metal source is wasted as well.

SUMMARY OF THE INVENTION

The aim of the detailed description summarizes some aspects of the Examples in the present invention and briefly introduces some preferable Examples. The detailed description, the abstract and the invention title may be abbreviated or omitted to avoid the detailed description, the abstract and the invention title being vague. These abbreviations or omissions are not able to limit the scope of the present invention.

In light of aforesaid description and/or problems existing in current flocculant products, the present invention is proposed.

Therefore, one of the aims of the present invention is to overcome the deficiency of current products, and to provide a flocculant for catalytic decomposition of flue gas desulfurization wastewater treatment.

To address above technical problems, according to one aspect of the present invention, the present invention provides following technical solution: a flocculant for catalytic decomposition of flue gas desulfurization wastewater treatment comprising polyacrylamide, inorganic polymer and an inorganic compound with low molecular weight.

Preferably, the polyacrylamide is cationic polyacrylamide.

Preferably, the cationic polyacrylamide is a copolymer of quaternary ammonium salt and polyacrylamide.

Preferably, the quaternary ammonium salt serving as the cation monomer is represented as following formula:

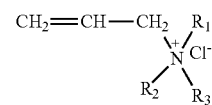

Preferably, based on the weight of the flocculant, the amount of polyacrylamide is 0-50%, the amount of inorganic polymer is 0-50%, and the amount of inorganic compound with low molecular weight is 50-95%.

Preferably, the molecular weight of cationic polyacrylamide ranges from 1 to 500,000, and the cation degree ranges from 0 to 80% weight ratio. Preferably, the cationic polyacrylamide is a copolymer of quaternary ammonium salt and polyacrylamide.

Preferably, the inorganic polymer consists of poly aluminum chloride and poly ferric sulfate.

Preferably, the inorganic compound with low molecular weight consists of aluminum sulfate, zinc sulfate, and copper sulfate.

Preferably, the amount of obtained flocculant used in wastewater is 100-300 mg/L.

Preferably, the obtained flocculant is applied in catalytic decomposition of flue gas desulfurization wastewater treatment, the application thereof further including surface waster treatment such as Huang He river treatment, dyeing wastewater treatment, papermaking wastewater treatment, pharmaceutical wastewater treatment and agricultural wastewater treatment.

The significant merits of the present invention compared to the prior art include:
1. The water treatment scope of obtained flocculant is broad. The flocculant can stand high temperature and water containing high amount of salt, and the impact of resistance of the flocculant is high.
2. The flocculation performance of obtained flocculant is good, which can significantly reduce the amount of oil, suspended matter, and COD in wastewater.
3. The flocculant does not corrode and block the apparatus.
4. The used amount of the flocculant is small, and the hazardous waste generated is less.
5. The application scope of the flocculant is broad. The flocculant can be used in catalytic decomposition of flue gas desulfurization wastewater treatment. Besides, it can be used in Huang He river (surface water) treatment, dyeing wastewater treatment, papermaking wastewater treatment, pharmaceutical wastewater treatment and agricultural wastewater treatment.

BRIEF DESCRIPTION OF THE DRAWINGS

To clearly describe the technical features of Examples in the present invention, drawings are briefly introduced below. Obviously, the drawings below are merely some Examples of the present invention. For one person having ordinary skill in the art, he/she may obtain other drawings based on these drawings without creative efforts.

DETAILED DESCRIPTION

Figure 1:
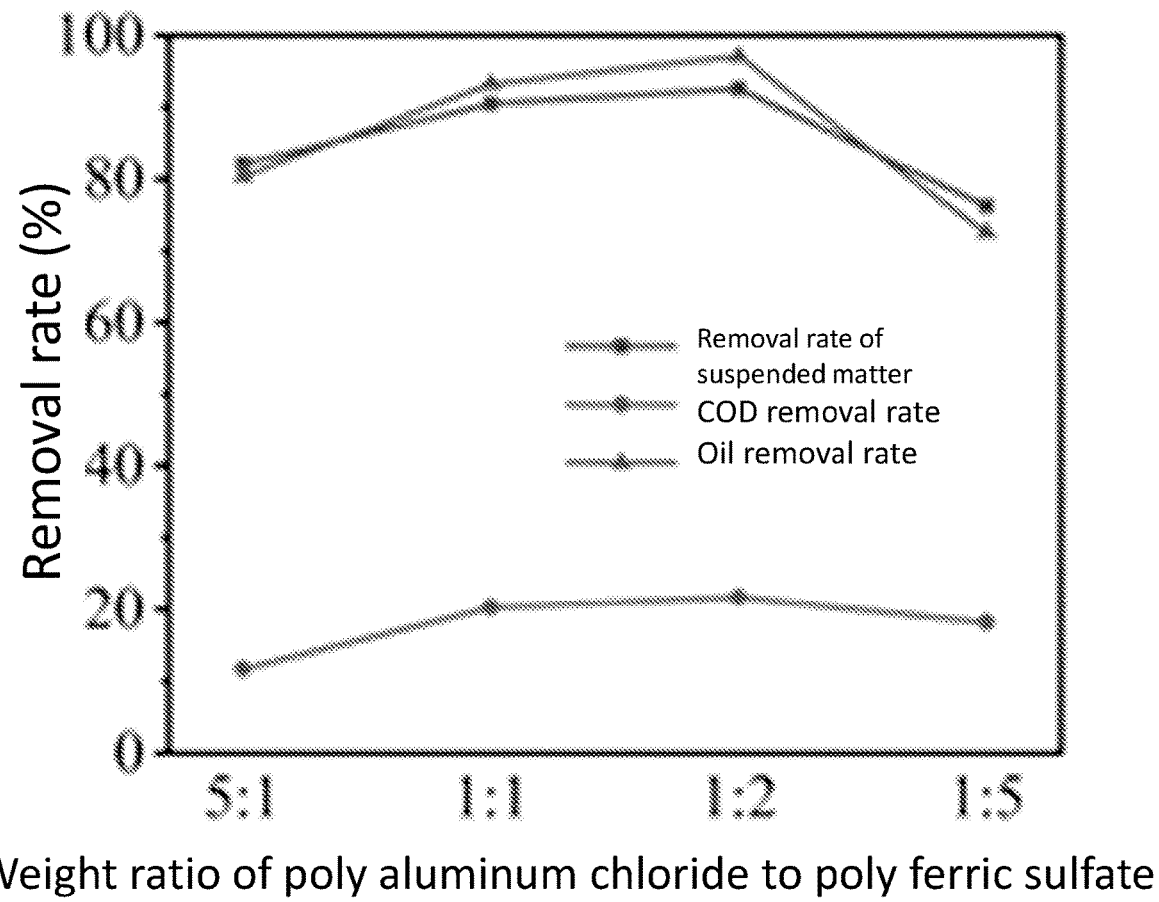
FIG. 1 illustrates the removal rate employed by the flocculants with different ratios of poly aluminum chloride to poly sulfate.

To clarify the above aims, features, and merits, details of embodiments are described as follows.

Many details are described below to make the present invention fully understood, but other approaches are able to employ the present invention without violating the spirit of the present invention by one person having ordinary skill in the art. Therefore, the invention is not limited by the Examples disclosed below.

Herein, "one Example" or "Examples" refers to specific features, structures or properties contained in at least one of embodiments in the present invention. "In one of the embodiments" in different places of the specification does not refer to the same Example, nor the mutually exclusive Examples. Subjecting to one person having ordinary skill in the art, Examples are described below.

In the Examples of the invention, SS value was tested using a Lohand Biological LH-XZ03 suspended solids meter.

Example 1

The novel flocculant in the Example includes 23 wt % cationic polyacrylamide (of which the R1, R2, and R3 groups of the quaternary ammonium cation were methyl group, methyl group, and allyl group, the molecular weight of cationic polyacrylamide was 100,000, and the cation degree was 43%), 14 wt % inorganic polymer (of which the ratio of poly aluminum chloride to poly ferric sulfate was 1:2, the basicities of poly aluminum chloride and poly ferric sulfate were 2.2% and 16% respectively, and the molecular weights of poly aluminum chloride and poly ferric sulfate were 1,100 and 2,000 respectively), and 63 wt % inorganic compound with low molecular weight (of which the ratio of aluminum sulfate, zinc sulfate, and copper sulfate was 2:3:5). The obtained flocculant was used to treat Yangzi petrochemical wastewater. The removal rate of suspended matter was 92.7% (as analyzed by absorbance measurement), the COD removal rate was 21.7% (as analyzed under international standard method), and the oil removal rate was 97.1% (as analyzed by infrared spectroscopy.).

Example 2

Compared to Example 1, for Example 2 the mass proportion of cationic polyacrylamide, inorganic polymer, and inorganic compound with low molecular weight as listed in Table 1 were different, while all other parameters were the same for Example 1 and Example 2.

Table 1: The mass proportions of the three components in Example 2 were different from Example 1.

| Component | Percentage | | | | | | | | |
| --- | --- | --- | --- | --- | --- | --- | --- | --- | --- |
| Cationic polyacrylamide (%) | 5 | 0 | 2.5 | 50 | 0 | 25 | 20 | 0 | 0 |
| Inorganic polymer (%) | 0 | 5 | 2.5 | 0 | 50 | 25 | 20 | 40 | 40 |
| Inorganic compound with low molecular weight (%) | 95 | 95 | 95 | 50 | 50 | 50 | 60 | 60 | 60 |

The obtained flocculants comprising different components listed in Table 1 were used to treat Yangzi petrochemical wastewater. The obtained flocculant with a weight ratio of cationic polyacrylamide, inorganic polymer, and inorganic compound with low molecular weight of 2.5:2.5:95 had a removal rate of suspended matter of 72.3%, a COD removal rate of 11.2%, and an oil removal rate of 72.1%. The obtained flocculant with a weight ratio of cationic polyacrylamide, inorganic polymer, and inorganic compound with low molecular weight of 25:25:50 had a removal rate of suspended matter of 81.7%, a COD removal rate of 12.1%, and an oil removal rate of 73.4%. The obtained flocculant with a weight ratio of cationic polyacrylamide, inorganic polymer, and inorganic compound with low molecular weight of 20:20:60 had a removal rate of suspended matter of 91.4%, a COD removal rate of 9.8%, and an oil removal rate of 84.1%. In summary, the flocculant of Example 1 had the best flocculation effect while treating Yangzi petrochemical wastewater. Different amounts of cationic polyacrylamide, inorganic polymer, and inorganic compound with low molecular weight were used to obtain corresponding flocculants of the present invention. However, those flocculants had worse performance compared to Example 1. The best ratio of components was shown as Example 1.

Example 3

Compared to Example 1, for Example 3 the component ratios in the inorganic polymer as listed in Table 2 were different, while all other parameters were the same for Example 1 and Example 3.

Table 2: The weight ratios of poly aluminum chloride to poly ferric sulfate in Example 3 were different from Example 1.

| Component | Weight ratio | | | | | |
|---|---|---|---|---|---|---|
| Poly aluminum chloride: poly ferric sulfate | 0:01 | 1:00 | 1:01 | 1:02 | 2:01 | 1:05 5:01 |

The removal rates of the obtained flocculants with different ratios of polymers were analyzed. The result is shown in FIG. 1. In FIG. 1, different ratios of polymers were able to obtain corresponding flocculants. However, those flocculants had worse flocculation performances compared to Example 1. The best ratio of components was shown as Example 1.

Example 4

Aside from the molecular weights of cationic polyacrylamide, the other parameters of Example 4 were the same as Example 1. The molecular weights of cationic polyacrylamide were 30,000, 50,000, 70,000, 90,000, 200,000, and 500,000 respectively.

Figure 2:
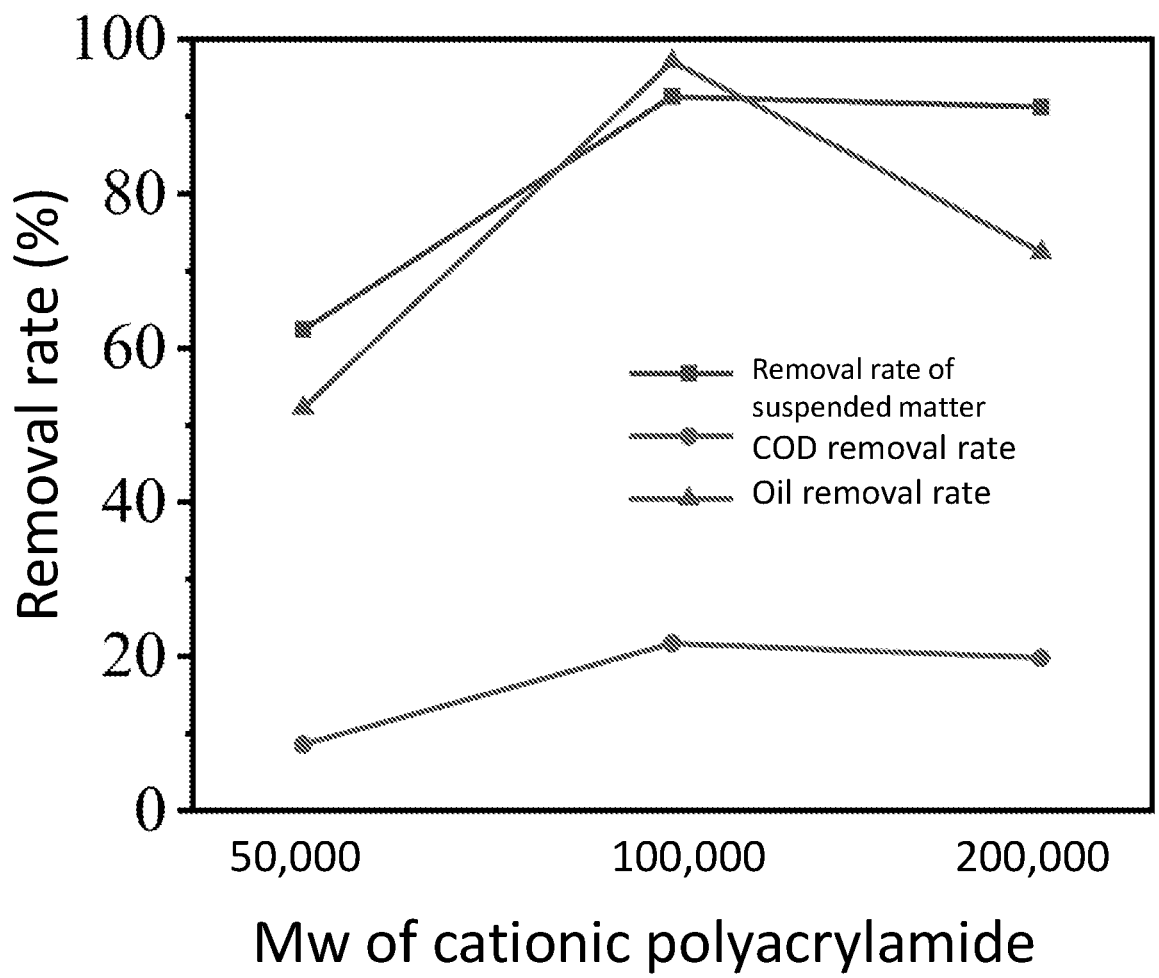
FIG. 2 illustrates the removal rate employed by the flocculants with polyacrylamide in different molecular weights.

The obtained flocculants with different molecular weights of cationic polyacrylamide are shown as FIG. 2. The cationic polyacrylamide with different molecular weights were able to obtain flocculants. However, the removal rate was the highest when the flocculant had cationic polyacrylamide with molecular weight of 100,000. Example 1 had the preferable molecular weight of cationic polyacrylamide.

Example 5

Aside from the cation degrees of cationic polyacrylamide, the other parameters of Example 5 were the same as Example 1. The cation degrees of cationic polyacrylamide were 0%, 10%, 20%, 30%, 40%, 50%, 60%, 70%, and 80% respectively.

Figure 3:
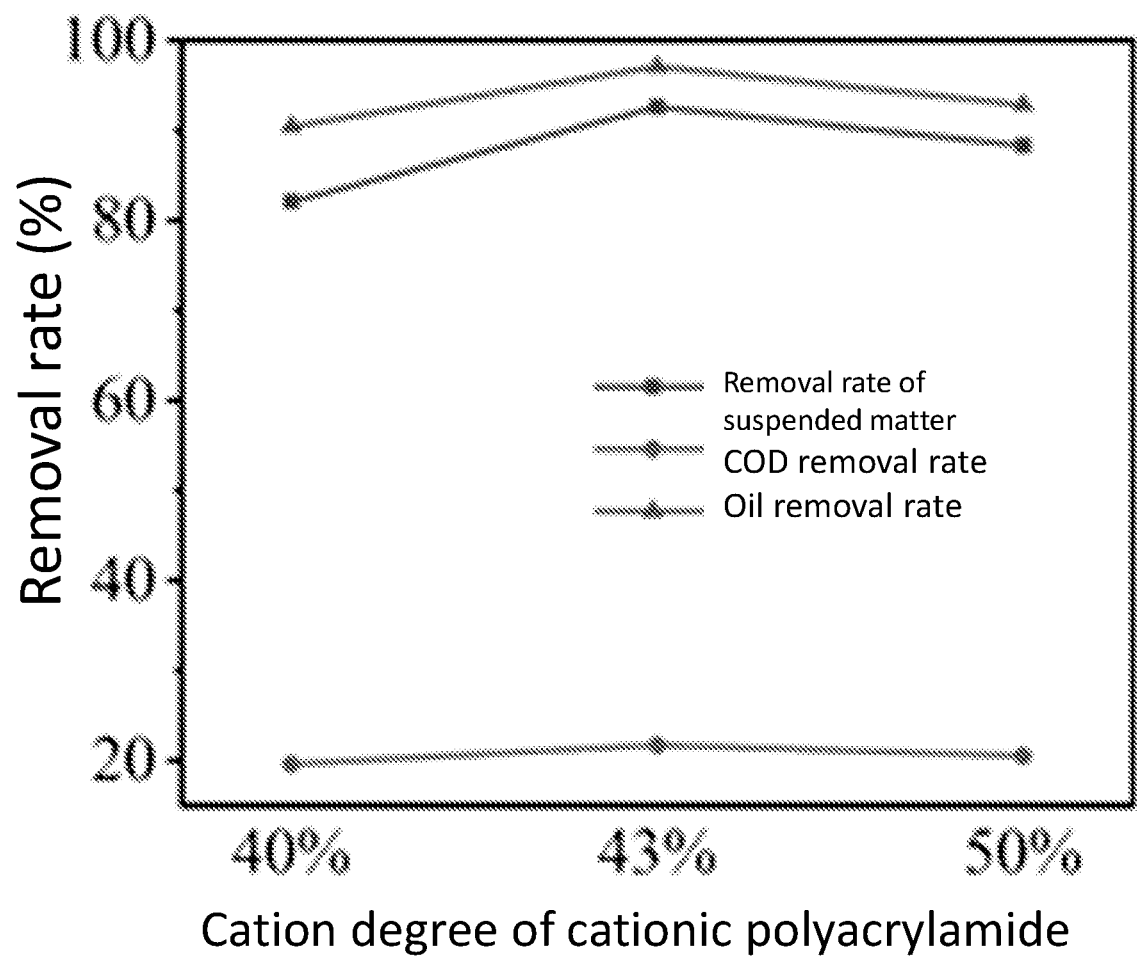
FIG. 3 illustrates the removal rate employed by the flocculants with polyacrylamide with different cation degrees.

The obtained flocculants with different molecular weight of cationic polyacrylamide are shown as FIG. 3. The cationic polyacrylamide with different cation degrees were able to obtain flocculants. However, the product performance of Example 1 was the best, and Example 1 had the preferable cation degree.

Example 6

The novel flocculant of the Example includes 40 wt % cationic polyacrylamide (of which the R1, R2, and R3 groups of the quaternary ammonium cation were methyl group, allyl group, and allyl group, the molecular weight of cationic polyacrylamide was 50,000, and the cation degree was 42%), 5 wt % inorganic polymer (of which the ratio of poly aluminum chloride to poly ferric sulfate was 1:1 and the basicities of poly aluminum chloride and poly ferric sulfate were 2.1% and 10% respectively), and 55 wt % inorganic compound with low molecular weight (of which the ratio of aluminum sulfate, zinc sulfate, and copper sulfate was 3:8:1). The obtained flocculant was used to treat Jinling petrochemical catalytic decomposition of flue gas desulfurization wastewater. 55 mg/L of novel flocculant was added to the wastewater. The result showed that the SS value of the wastewater was reduced from 2450 mg/L to 55 mg/L. The novel flocculant had excellent performance of suspended matter treatment, and the treated wastewater met the requirement of suspended matter less than 60 mg/L.

Example 7

The novel flocculant of the Example includes 50 wt % cationic polyacrylamide (of which the R1, R2, and R3 groups of the quaternary ammonium cation were ethyl group, ethyl group, and allyl group, the molecular weight of cationic polyacrylamide was 120,000, and the cation degree was 37%), 0 wt % inorganic polymer, and 50 wt % inorganic compound with low molecular weight (of which the ratio of aluminum sulfate, zinc sulfate, and copper sulfate was 5:2:1). The obtained flocculant was used to treat Daqing petrochemical catalytic decomposition of flue gas desulfurization wastewater. 400 mg/L of novel flocculant was added to the wastewater. The result showed that the SS value of the wastewater was reduced from 225 mg/L to 13 mg/L. The novel flocculant had excellent performance of suspended matter treatment, and the treated wastewater met the requirement of suspended matter less than 60 mg/L.

Example 8

The novel flocculant of the Example includes 22 wt % cationic polyacrylamide (of which the R1, R2, and R3 groups of the quaternary ammonium cation are methyl group, methyl group, and allyl group, the molecular weight of cationic polyacrylamide is 30,000, and the cation degree is 37%), 11 wt % inorganic polymer (of which the ratio of poly-aluminum chloride to poly-ferric sulfate is 1:4, and the basicities of poly-aluminum chloride and poly-ferric sulfate are 2.0% and 15% respectively), and 67 wt % inorganic compound with low molecular weight (of which the ratio of aluminum sulfate, zinc sulfate, and copper sulfate is 5:0:1). The obtained flocculant was used to treat Panjin Northern Asphalt Fuel Co. Ltd. wastewater. 500 mg/L of novel flocculant was added to the wastewater. The result showed that the SS value of the wastewater was reduced from 1460 mg/L to 24 mg/L. The novel flocculant had excellent performance of suspended matter treatment, and the treated wastewater met the requirement of suspended matter less than 60 mg/L.

Example 9

The novel flocculant of the Example includes 5 wt % cationic polyacrylamide (of which the R1, R2, and R3 groups of the quaternary ammonium cation were methyl group, allyl group, and allyl group, the molecular weight of cationic polyacrylamide was 200,000, and the cation degree was 65%), 10 wt % inorganic polymer (of which the ratio of poly aluminum chloride to poly ferric sulfate was 1:5, and the basicities of poly aluminum chloride and poly ferric sulfate were 2.2% and 14% respectively), and 85 wt % inorganic compound with low molecular weight (of which the ratio of aluminum sulfate, zinc sulfate, and copper sulfate was 5:4:1). The obtained flocculant was used to treat Maoming petrochemical catalytic decomposition of flue gas desulfurization wastewater. 300 mg/L of novel flocculant was added to the wastewater. The result showed that the SS value of the wastewater was reduced from 5874 mg/L to 28.4 mg/L. The novel flocculant had excellent performance of suspended matter treatment, and the treated wastewater met the requirement of suspended matter less than 60 mg/L.

Example 10

The novel flocculant of the Example includes 27 wt % cationic polyacrylamide (of which the R1, R2, and R3 groups of the quaternary ammonium cation were methyl group, allyl group, and allyl group, the molecular weight of cationic polyacrylamide was 100,000, and the cation degree was 42%), 10 wt % inorganic polymer (of which the ratio of poly aluminum chloride to poly ferric sulfate was 0:1, and the basicities of poly aluminum chloride and poly ferric sulfate were 2.2% and 12% respectively), and 63 wt % inorganic compound with low molecular weight (of which the ratio of aluminum sulfate, zinc sulfate, and copper sulfate was 5:4:0). The obtained flocculant was used to treat Zhejiang petrochemical catalytic decomposition of flue gas desulfurization wastewater. 500 mg/L of novel flocculant was added to the wastewater. The result showed that the SS value of the wastewater was reduced from 2850 mg/L to 32 mg/L. The novel flocculant had excellent performance of suspended matter treatment, and the treated wastewater met the requirement of suspended matter less than 60 mg/L.

Example 11

The novel flocculant of the Example includes 5 wt % cationic polyacrylamide (of which the R1, R2, and R3 groups of the quaternary ammonium cation were methyl group, allyl group, and allyl group, the molecular weight of cationic polyacrylamide was 50,000, and the cation degree was 42%), 0 wt % inorganic polymer, and 95 wt % inorganic compound with low molecular weight (of which the ratio of aluminum sulfate, zinc sulfate, and copper sulfate was 0:1:0). The obtained flocculant was used to treat pharmaceutical wastewater. 100 mg/L of novel flocculant was added to the wastewater. The result showed that the novel flocculant had a bacteria removal rate of 99.998%, an SS removal rate of 87%, and a color removal rate of 70%.

Example 12

The novel flocculant of the Example includes 40 wt % cationic polyacrylamide (of which the R1, R2, and R3 groups of the quaternary ammonium cation were methyl group, allyl group, and allyl group, the molecular weight of cationic polyacrylamide was 70,000, and the cation degree was 38%), 10 wt % inorganic polymer (of which the ratio of poly aluminum chloride to poly ferric sulfate was 1:1, and the basicities of poly aluminum chloride and poly ferric sulfate were 2.2% and 8% respectively), and 50 wt % inorganic compound with low molecular weight (of which the ratio of aluminum sulfate, zinc sulfate, and copper sulfate was 0:1:0). The obtained flocculant was used to treat dyeing wastewater. 300 mg/L of novel flocculant was added to the wastewater. The result showed that the novel flocculant had a bacteria removal rate of 97%, an SS removal rate of 82%, a color removal rate of 90%, and a COD removal rate of 71%.

Example 13

The novel flocculant of the Example includes 20 wt % cationic polyacrylamide (of which the R1, R2, and R3 groups of the quaternary ammonium cation were methyl group, methyl group, and allyl group, the molecular weight of cationic polyacrylamide was 200,000, and the cation degree was 45%), 20 wt % inorganic polymer (of which the ratio of poly aluminum chloride to poly ferric sulfate was 2:1, and the basicities of poly aluminum chloride and poly ferric sulfate were 2.1% and 9% respectively), and 60 wt % inorganic compound with low molecular weight (of which the ratio of aluminum sulfate, zinc sulfate, and copper sulfate was 1:5:2). The obtained flocculant was used to treat Huang He river water. 100 mg/L of novel flocculant was added to the wastewater. The result showed that the novel flocculant had a SS removal rate of 92%, and a color removal rate of 90%.

Example 14

The novel flocculant of the Example includes 21 wt % cationic polyacrylamide (of which the R1, R2, and R3 groups of the quaternary ammonium cation were methyl group, allyl group, and allyl group, the molecular weight of cationic polyacrylamide was 300,000, and the cation degree was 38%), 10 wt % inorganic polymer (of which the ratio of poly aluminum chloride to poly ferric sulfate was 1:2, and the basicities of poly aluminum chloride and poly ferric sulfate were 2.2% and 12% respectively), and 69 wt % inorganic compound with low molecular weight (of which the ratio of aluminum sulfate, zinc sulfate, and copper sulfate was 1:5:2). The obtained flocculant was used to treat papermaking wastewater. 200 mg/L of novel flocculant was added to the wastewater. The result showed that the novel flocculant had an SS removal rate of 94%, a color removal rate of 88%, and a COD removal rate of 82%.

It should be explained that above Examples are used to illustrate the present invention only instead of limiting the scope of the present invention. Although details of the present invention is illustrated according to preferable Examples, one person having ordinary skill in the art should understand that the technical features of the present invention are able to be modified or equally replaced without departing the spirit of the present invention and the technical features should be included in the claims of the present invention.

The invention claimed is:

1. A flocculant for catalytic decomposition of flue gas desulfurization wastewater treatment comprising cationic polyacrylamide with a molecular weight of 100,000-500,000, inorganic polymer, and inorganic compound consisting of aluminum sulfate, zinc sulfate, and copper sulfate, wherein the cationic polyacrylamide is a copolymer and has a cation degree of 40-50% (mass ratio), wherein the ratio of the aluminum sulfate, the zinc sulfate, and the copper sulfate is 2:3:5.

2. The flocculant of claim 1, wherein the cationic polyacrylamide is a copolymer of quaternary ammonium salt and acrylamide.

3. The flocculant of claim 2, wherein the quaternary ammonium salt serving as cation monomer is represented as following formula:

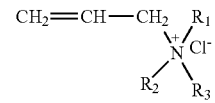

wherein $R_1$, $R_2$, and $R_3$ are independently or jointly selected from the group consisting of: methyl, methyl, or allyl.

4. The flocculant of claim 1, wherein the polyacrylamide is 2.5-50 wt %, the inorganic polymer is 2.5-50 wt %, and the inorganic compound is 50-95 wt %.

5. The flocculant of claim 1, wherein the inorganic polymer consists of poly aluminum chloride and poly ferric sulfate.

6. The flocculant of claim 5, wherein the poly aluminum chloride and poly ferric sulfate has a weight ratio of 1:1-5:1.

7. A method for treating surface water, comprising adding 100-300 mg/L of the flocculant of claim 1 into the surface water, wherein the surface water includes, dyeing wastewater, papermaking wastewater, pharmaceutical wastewater and agricultural wastewater.

\* \* \* \* \*